United States Patent
Grundvig et al.

(10) Patent No.: US 7,872,821 B2
(45) Date of Patent: Jan. 18, 2011

(54) SYSTEMS AND METHODS FOR NYQUIST TONE HARMONIC MEASUREMENTS

(75) Inventors: Jeffrey P. Grundvig, Loveland, CO (US); George Mathew, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/430,948

(22) Filed: Apr. 28, 2009

(65) Prior Publication Data

US 2010/0271724 A1    Oct. 28, 2010

(51) Int. Cl.
G11B 5/02 (2006.01)
G11B 21/02 (2006.01)

(52) U.S. Cl. .......................................... 360/25; 360/75
(58) Field of Classification Search ........................ None
See application file for complete search history.

(56) References Cited

U.S. PATENT DOCUMENTS

| | | | |
|---|---|---|---|
| 6,181,505 B1 * | 1/2001 | Sacks et al. .............. 360/77.08 |
| 6,674,590 B2 * | 1/2004 | Ottesen et al. ................ 360/31 |
| 6,894,854 B1 * | 5/2005 | Carlson et al. ................ 360/31 |
| 7,271,753 B1 * | 9/2007 | Padukone et al. ........... 341/139 |
| 7,440,224 B2 * | 10/2008 | Ehrlich et al. ............ 360/77.08 |
| 7,542,227 B2 * | 6/2009 | Che et al. ..................... 360/75 |
| 7,715,135 B1 * | 5/2010 | Sutardja et al. ............... 360/40 |

* cited by examiner

Primary Examiner—K. Wong
(74) Attorney, Agent, or Firm—Hamilton, DeSanctis & Cha

(57) ABSTRACT

Various embodiments of the present invention provide systems and methods for determining changes in fly-height. For example, various embodiments of the present invention provide storage devices that include a storage medium, an offset frequency, a read/write head assembly, and a harmonic fly-height change detection circuit. The storage medium includes a periodic data pattern that repeats at a data frequency. The read/write head assembly disposed in relation to the storage medium such that it senses the periodic data pattern and provides a sensed periodic data pattern. The harmonic fly-height change detection circuit samples the sensed periodic data pattern at an aggregate frequency to yield a first set of samples and a second set of samples. The aggregate frequency is the data frequency adjusted by the offset frequency. The harmonic fly-height change detection circuit calculates a first magnitude of the first set of samples and a second magnitude of the second set of samples.

22 Claims, 3 Drawing Sheets

SYSTEMS AND METHODS FOR NYQUIST TONE HARMONIC MEASUREMENTS

BACKGROUND OF THE INVENTION

The present inventions are related to systems and methods for accessing a storage medium, and more particularly to systems and methods for determining the location of a read/write head assembly in relation to a storage medium.

Writing information to a magnetic storage medium typically includes generating a magnetic field in close proximity to the storage medium to be written. This may be done using a read/write head assembly as are commonly known in the art, and is highly dependent on properly positioning the read/write head assembly in relation to a magnetic storage medium. The distance between the read/write head assembly and the storage medium is commonly referred to as fly-height. Proper control of the fly-height helps to assure that the read back signal exhibits the best possible signal-to-noise ratio, and thereby improves performance.

In a typical implementation, fly-height is determined based on harmonic measurements from data derived from the storage medium. Harmonic single frequency magnitude calculations have typically been performed using a single discrete Fourier transform type integration and calculation. In general, such an approach relies on multiplying the input data stream by two correlation sequences where the correlation sequences are sine and cosine wave samples at a desired frequency to be measured. For very accurate measurements, the aforementioned correlation is performed over a large number of samples. The final magnitude developed over the number of samples is calculated by taking the square root of the sum of squares of the sine and cosine integration results. In such a case where the frequency is the Nyquist frequency, then such a method is dependent on the sampling phase of the measured signal. For example, if a Nyquist pattern is sampled at the zero crossings, then the result of the approach is zero. In contrast, a maximum value results where the Nyquist pattern is sampled at the peaks. As such, the performance of an equalization and timing loop directly impacts the result, thereby limiting the effectiveness of the harmonic measurement.

Hence, for at least the aforementioned reasons, there exists a need in the art for advanced systems and methods for determining fly-height.

BRIEF SUMMARY OF THE INVENTION

The present inventions are related to systems and methods for accessing a storage medium, and more particularly to systems and methods for determining the location of a read/write head assembly in relation to a storage medium.

Various embodiments of the present invention provide storage devices. Such storage devices include a storage medium, an offset frequency, a read/write head assembly, and a harmonic fly-height change detection circuit. The storage medium includes a periodic data pattern that repeats at a data frequency. The read/write head assembly disposed in relation to the storage medium such that it senses the periodic data pattern and provides a sensed periodic data pattern. The harmonic fly-height change detection circuit samples the sensed periodic data pattern at an aggregate frequency to yield a first set of samples and a second set of samples. The aggregate frequency is the data frequency adjusted by the offset frequency. The harmonic fly-height change detection circuit calculates a first magnitude of the first set of samples and a second magnitude of the second set of samples. In some instances, the aggregate frequency is the data frequency less the offset frequency. In other instances, the aggregate frequency is the data frequency plus the offset frequency. In various instances of the aforementioned embodiments, the periodic pattern is a Nyquist pattern, and wherein the data frequency is a Nyquist frequency.

In some instances of the aforementioned embodiments of the present invention, the first set of samples is included in a first integration window, and the second set of samples is included in a second integration window. The first magnitude of the first set of samples is a magnitude of a discrete Fourier transform of the first integration window, and the second magnitude of the second set of samples is a magnitude of a discrete Fourier transform of the second integration window. In some cases, the first magnitude of the first set of samples is calculated in accordance with the following equation:

$$\text{absolute value of } \left[ \sum_{i=0}^{i=k-1} Sample_i * (-1)^i \right],$$

where k corresponds to the number of samples in the first integration window. In various cases, the harmonic fly-height change detection circuit includes an accumulator circuit. In such cases, the accumulator circuit is operable to sum at least the first magnitude of the first set of samples and the second magnitude of the second set of samples to yield and aggregate value. In some cases, the aggregate of the first magnitude of the first set of samples and the second magnitude of the second set of samples is done in accordance with the following equation:

$$\text{absolute value of } \left[ \sum_{i=0}^{i=k-1} Sample_i * (-1)^i \right] + \text{absolute value of } \left[ \sum_{i=k+n}^{i=2k+n-1} Sample_i * (-1)^i \right]$$

where k corresponds to the number of samples in the first integration window and the second integration window, and wherein n is the number of samples between the first integration window and the second integration window. In some cases, n is zero and k is a value between sixteen and sixty four. In particular case, the value of k is programmable.

In some instances of the aforementioned embodiments, the harmonic fly-height change detection circuit includes a comparator that compares the aggregate value with a baseline value. The comparator asserts a fly-height change indicator when the magnitude of the difference between the aggregate value and the baseline value exceeds a threshold value. In particular cases, the threshold value is zero.

Other embodiments of the present invention provide methods for identifying distance error based on Nyquist data. Such methods include providing a baseline value corresponding to a known position; providing a storage medium, and providing an offset frequency. The storage medium includes a periodic data pattern that repeats at a data frequency. The periodic data is sampled to yield a plurality of sample sets corresponding to respective integration windows. The aforementioned sampling is done at an aggregate frequency that is the data frequency adjusted by the offset frequency. A magnitude for each of the respective integration windows is calculated, and the magnitudes corresponding to each of the respective integration windows are aggregated to yield an aggregate value. The aggregate value is compared with the baseline value, and a signal indicating a change in the known position is asserted when the magnitude of the difference between the aggregate value and the baseline value exceeds a threshold value. In some cases, the threshold value is non-zero, while in other cases, the threshold value is zero.

Yet other embodiments of the present invention provide Nyquist tone circuits. The circuits include a baseline value, an offset frequency, a frequency summation circuit, a sampling circuit, a magnitude calculation circuit, an aggregation circuit, and a comparator circuit. The frequency summation circuit yields an aggregate frequency that is a data frequency adjusted by the offset frequency. The data frequency corresponds to a periodicity of an input data stream. The sampling circuit samples the input data stream at the aggregate frequency to yield a plurality of sample sets corresponding to respective integration windows. The magnitude calculation circuit calculates a magnitude for each of the respective integration windows, and the aggregation circuit sums the magnitudes corresponding to each of the respective integration windows to yield an aggregate value. The comparator circuit compares the aggregate value with the baseline value, and asserts a fly-height indicator signal based at least in part on the comparison.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for accessing a storage medium, and more particularly to systems and methods for determining the location of a read/write head assembly in relation to a storage medium.

Various embodiments of the present invention provide and/or incorporate Nyquist tone (i.e., Nyquist pattern) measurement circuits that integrate the absolute values of a number of Nyquist integration windows with a slight frequency offset such that sampling phases of the Nyquist pattern are randomly included to produce a repeatable result. This repeatable result may be compared with an earlier generated result to detect a change in fly-height.

Figure 1A:
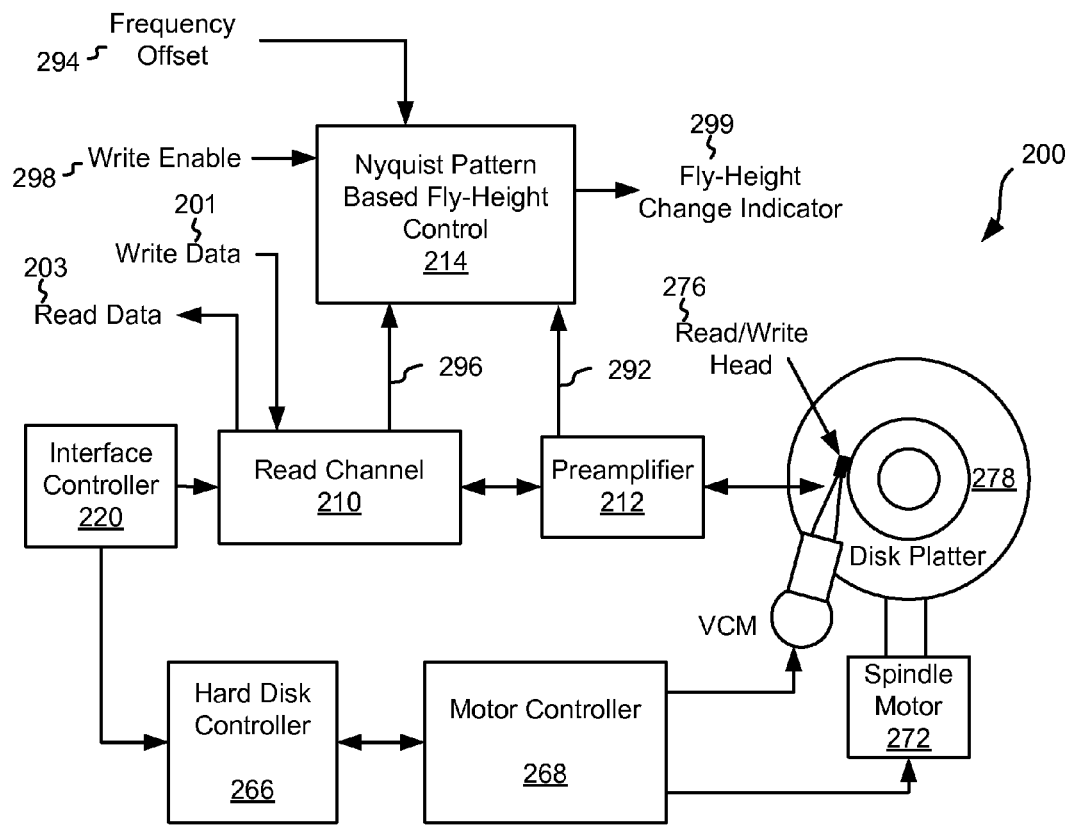
FIG. 1A depicts a storage device including a read channel with a Nyquist pattern based fly-height change detection circuit in accordance with one or more embodiments of the present invention.

Turning to FIG. 1A, a storage system 200 including a Nyquist pattern based fly-height change detection circuit 214 is shown in accordance with various embodiments of the present invention. Storage system 200 may be, for example, a hard disk drive. In addition, storage system 200 includes an interface controller 220, a preamplifier 212, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In a typical read/write operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly 276 to the proper data track on disk platter 278 under the direction of hard disk controller 266. Spindle motor 272 spins disk platter 278 at a determined spin rate (RPMs). A read channel circuit 210 receives information from preamplifier 212 and performs a data decode/detection process as is known in the art to recover the data originally written to disk platter 278 as read data 203. In addition, read channel circuit 210 receives write data 201 and provides it to preamplifier 212 in a form writable to disk platter 278 as is known in the art.

Figure 1B:
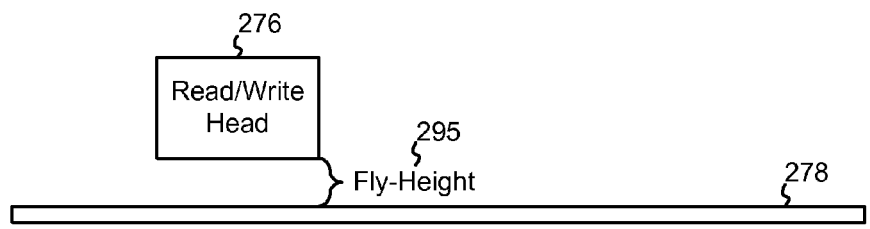
FIG. 1B depicts the read/write head assembly of FIG. 1A disposed in relation to the disk platter of FIG. 1A.

Nyquist pattern based fly-height change detection circuit 214 receives an analog input stream 292 from preamplifier 212, a sampling frequency 296 from read channel 210, a frequency offset 294, and a write enable 298. Sampling frequency 296 is derived from the frequency of the data received from disk platter 278, and is equal to twice the Nyquist frequency. Nyquist pattern based fly-height change detection circuit 214 samples analog input stream 292 at sampling frequency 296 plus offset frequency 294. Using the samples, a partial discrete Fourier transform is calculated. This process is repeated a number of times, with the results being aggregated and stored. Where this is an initial instance of the process, write enable 298 is asserted allowing for storage of the result in a designated long term register. The process is later repeated with the earlier stored result being compared with a later calculated result. Where there is a significant difference in the results, a fly-height change indicator 299 is asserted to indicate that there has been a detectable change in the fly-height 295 of read/write head assembly 276 in relation to disk platter 278 as shown in FIG. 1B. In some embodiments of the present invention, Nyquist pattern based fly-height change detection circuit 214 is implemented consistent with the circuit described below in relation to FIG. 3.

In operation, read/write head assembly 278 is positioned adjacent the proper data track, and magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 212. Preamplifier 212 is operable to condition the minute analog signals accessed from disk platter 278. In addition, preamplifier 212 is operable to condition data from read channel circuit 210 that is destined to be written to disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel module 210. This data is then encoded and written to disk platter 278.

Figure 2:
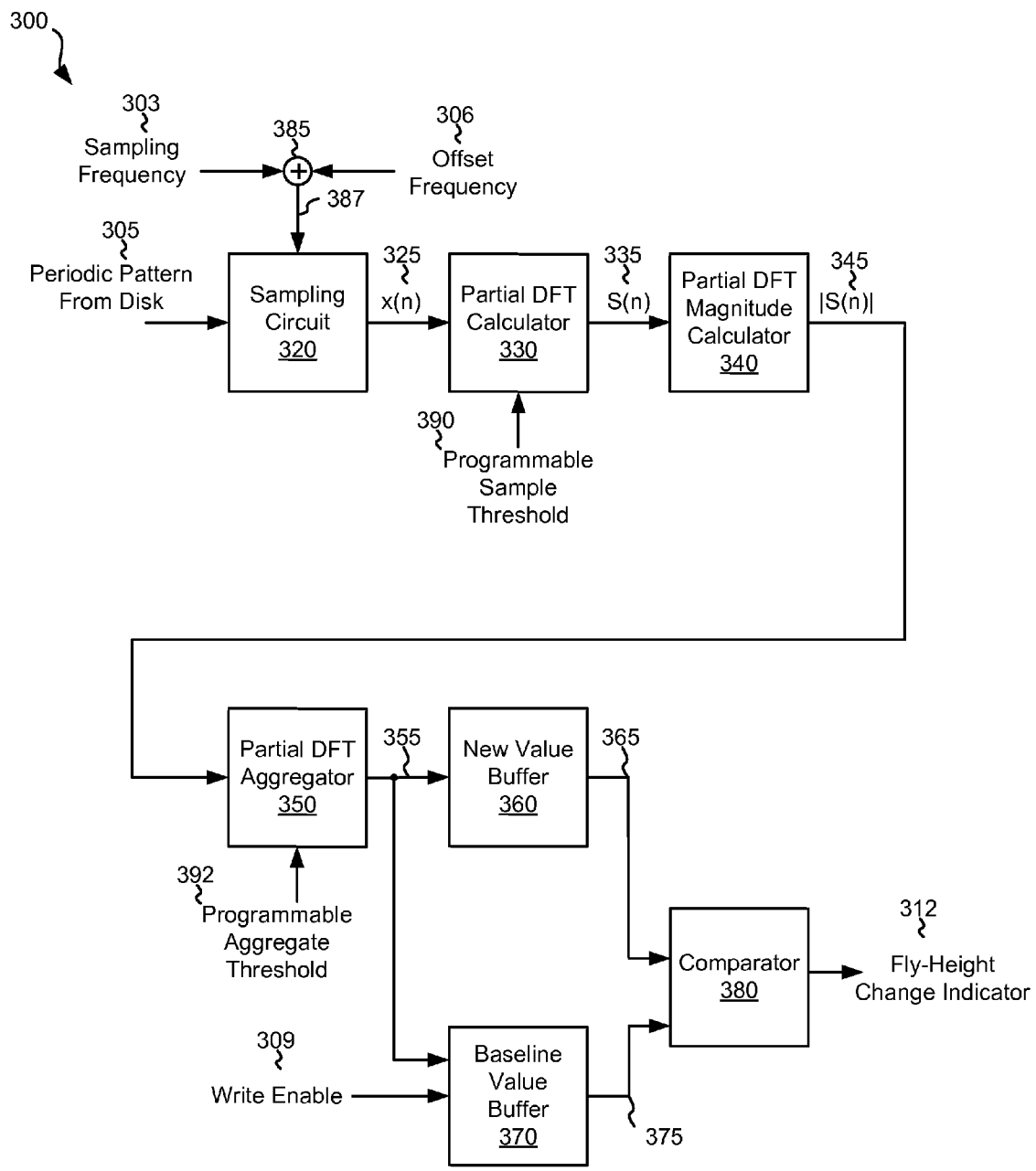
FIG. 2 depicts a Nyquist pattern based fly-height change detection circuit in accordance with one or more embodiments of the present invention.

Turning to FIG. 2, a Nyquist pattern based fly-height change detection circuit 300 is shown in accordance with one or more embodiments of the present invention. Nyquist pattern based fly-height change detection circuit 300 receives a sampling frequency 303, an offset frequency 306, a periodic pattern 305 obtained by reading the Nyquist pattern written on the disk, a programmable sample threshold 390 and a programmable aggregate threshold 392. In some cases, sampling frequency 303 is generated from data derived from a storage medium (not shown). As an example, data stored on a storage medium is written at a defined frequency. The data is provided to a clock generation circuit that is capable of regenerating sampling clock 303 from the data. In some cases, this clock generation may be done using a phase lock loop circuit as is known in the art. Based on the disclosure provided herein, one of ordinary skill in the art will recognize a variety of circuits that may be used to derive sampling frequency 303 from an input data stream.

In particular cases, the data stored on the storage medium is a Nyquist pattern exhibiting a Nyquist frequency. Since higher frequency measurements show more variation with fly-height, it may be desirable to be able to accurately measure the amplitude of such frequencies up to the Nyquist frequency. To allow for accurate sampling of the Nyquist pattern, offset frequency 306 is added to (or subtracted from) sampling frequency 303 using a summation circuit 385. The result is an aggregate frequency 387 that is provided to a sampling circuit 320. Offset frequency 306 is a small fraction of the sampling frequency. In one particular embodiment of the present invention, offset frequency 306 is approximately one percent (1%) of sampling frequency 303. Offset frequency 306 may be provided as an external clock input, or may be generated by dividing sampling frequency 303 using a divider circuit (not shown). In one particular embodiment of the present invention, offset frequency 306 is sampling frequency 303 divided by one hundred, twenty eight (128). Based on the disclosure provided herein, one of ordinary skill in the art will recognize a variety of sources for offset frequency 306 and/or circuits for deriving offset frequency 306 from sampling frequency 303.

Sampling circuit 320 samples periodic pattern 305 using aggregate frequency 387. As aggregate frequency 387 is slightly offset from sampling frequency 303, a varying set of values (i.e., a number of samples x(n) 325, where k designates the instant in time at which the sample is taken) are derived from the sampling process. Further, as offset frequency 306 is a known offset, the sampling phases of periodic pattern will begin repeating after a calculable number of sample periods. By using a large number of sample periods, comparable values can be created at different instants in time.

Once a defined number of samples is received, discrete Fourier transform calculation circuit 330 calculates a partial output (S(n)) 335. In some embodiments, the defined number of samples is programmable via a programmable sample threshold input 390 provided to discrete Fourier transform calculation circuit 330. The defined number of samples is chosen to be much less than the number of samples of periodic pattern that would be required for offset frequency 306 to cause the sampling to begin repeating. In some cases, the defined number of samples is between sixteen and sixty-four. The defined number of samples corresponds to a subset of periodic pattern 305 referred to herein as an integration window or in the case of a Nyquist pattern, a Nyquist integration window. Over this integration window, samples 325 are multiplied by the Nyquist frequency Fourier sequence of +1, −1, +1, −1 . . . , and the product of the multiplications are integrated over the Nyquist integration window to yield an integrated output 335 (S(n)). The following equation describes the integration process:

$$S(n) = x(n) - x(n+1) + x(n+2) - x(n+3) + \ldots x(n+k-1) = \sum_{i=0}^{i=k-1} Sample_i * (-1)^i,$$

where n represents the initial sample point in the integration window, and i represents the total number of samples included in the integration window.

At the end of the integration window (i.e., when the number of samples received corresponds to the defined number of samples), integration value 335 (S(x)) is provided to a partial discrete Fourier transform magnitude calculator circuit 340. Partial discrete Fourier transform magnitude calculator circuit 340 yields the magnitude of integration value 335 as defined by the following equation:

$$|S(n)|=|x(n)-x(n+1)+x(n+2)-x(n+3)+\ldots x(n+k-1)|.$$

The resulting absolute value 345 (|S(n)|) is provided as an output to a partial discrete Fourier transform aggregator circuit 350.

Partial discrete Fourier transform aggregator circuit 350 aggregates a defined number of magnitude of integration values 335. In some embodiments, the defined number of magnitude of integration values 335 is programmable via a programmable aggregate threshold input 392 provided to partial discrete Fourier transform aggregator circuit 350. The defined number of magnitude of integration values 335 is chosen such that a relatively large number of samples 325 are incorporated in an aggregate output 355 of partial discrete Fourier transform aggregator circuit 350. For example, in one embodiment, a total of four thousand, ninety six samples are included with each integration window including thirty two samples. In such a case, the defined number of magnitude of integration values 335 is one hundred, twenty eight. Based upon the disclosure provided herein, one of ordinary skill in the art will recognize a variety of overall numbers of samples, integration window sizes, and/or defined numbers of magnitude of integration values 335 that may be used in relation to different embodiments of the present invention.

In operation, samples of periodic pattern 305 are continuously sampled. The processes of sampling in sampling circuit 320, performing calculations in partial discrete Fourier transform calculation circuit 330 and performing calculations in partial discrete Fourier transform magnitude calculator circuit 340 is repeated until a number of samples 325 corresponding to the size of the integration window are processed. The product of the calculation (i.e., magnitude of integration value 335) is then aggregated with other magnitude of integration values 335 using partial discrete Fourier transform aggregator circuit 350. The aggregation process is repeated over a number of integration windows until a defined number of samples 325 have been processed. In some cases, the defined number of samples is chosen to be relatively large. In particular cases, the defined number of samples is the product of programmable sample threshold 390 (i.e., the size of the integration window) multiplied by programmable aggregate threshold 392 (i.e., the number of integration windows).

Once the defined number of samples 325 have been processed, aggregate output 355 is stored to a new value buffer 360. New value buffer 360 may be any circuit capable of storing a value. For example, new value buffer may be a register or a random access memory. Based upon the disclosure provided herein, one of ordinary skill in the art will recognize a variety of circuits that may be used to implement new value buffer 360. At initiation or during a set up period, a write enable 309 is asserted such that aggregate output 355 is also stored to a baseline value buffer 370. Baseline value buffer 370 may be any circuit capable of storing a value. In some cases, baseline value buffer is intended to be maintained indefinitely. As such, baseline value buffer 370 may be implemented using a non-volatile memory type such as, for example, a flash memory as are known in the art. Based upon the disclosure provided herein, one of ordinary skill in the art will recognize a variety of circuits that may be used to implement baseline value buffer 370.

By repeating the process of sampling and calculation over a large number of samples (i.e., over a long period of time), the slight offset created by aggregating sampling frequency 303 with offset frequency 306 assures that all possible sampling phases of periodic pattern 305 are incorporated in a repeatable and predictable average result reported as new value 365 (and upon assertion of write enable 309, reported as baseline value 375). As such, each instance of new value 365 may be meaningfully compared against baseline value 375 to detect a change in fly-height.

In operation, write enable 309 is asserted when the fly-height of a read/write head assembly relative to storage medium is at a known, desired value. Baseline value 375 maintained in baseline value buffer 370 is used as a reference to determine if a change in fly-height has occurred. After baseline value buffer 370 is loaded, write enable 309 is de-asserted and baseline value 375 is maintained constant. Over a period of time that baseline value 375 is maintained constant, new value 365 is repeatedly updated as periodic pattern 305 is re-sampled and processed as discussed above. During this time, the changing new value 365 is repeatedly compared with baseline value 375 using a comparator circuit 380. When new value 365 deviates significantly from baseline value 375, a fly-height change indicator output 312 is asserted. In some cases, a programmable threshold difference (not shown) is used by comparator 380 to determine whether a difference between new value 365 and baseline value 375 is large enough to warrant asserting fly-height change indicator output 312. In other cases, any difference between new value 365 and baseline value 375 results in assertion of fly-height change indicator output 312.

Various advantages may be achieved through use of Nyquist pattern based fly-height change detection circuit 300 as described above. As one of many advantages, a value corresponding to the amplitude of a Nyquist data pattern can be accurately done and used for comparison to determine whether any change in fly-height has occurred. In some cases where a large number of samples are used in calculating the aforementioned value, calculation of a meaningfully comparable value corresponding to the amplitude of a Nyquist data pattern can be accurately calculated independent of the phase of the start of integration. Further, the calculated value is not dependent upon the timing loop used in a hard disk drive incorporating circuit 300, and is also not dependent on the phase response of an equalization filter used in a hard disk drive incorporating circuit 300. For example, in particular implementations, sampling frequency 303 may be derived directly from periodic pattern 305, and not based upon the timing loop of an incorporating read channel device. Additionally, circuit 300 may be used with a pure Nyquist data pattern with conventional timing loops. Based upon the disclosure provided herein, one of ordinary skill in the art will recognize a variety of other advantages that can be achieved though use of different embodiments of the present invention.

Figure 3:
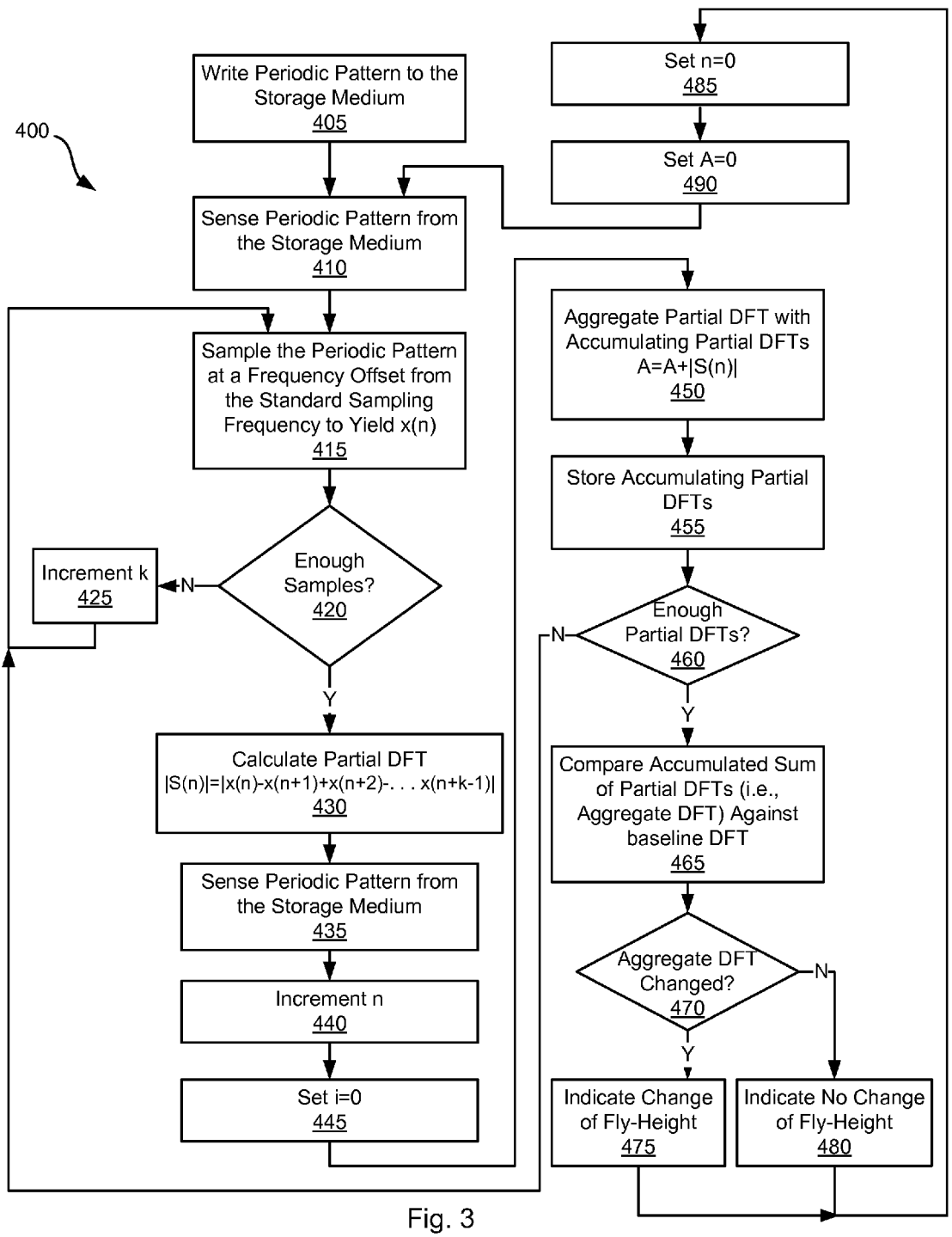
FIG. 3 is a flow diagram showing a method in accordance with various embodiments of the present invention for detecting a change in fly-height using a Nyquist pattern.

Turning to FIG. 3, a flow diagram 400 shows a method in accordance with various embodiments of the present invention for detecting a change in fly-height using a Nyquist pattern. Following flow diagram 400, a periodic pattern is written to a storage medium (block 405). In some cases, the periodic pattern is a Nyquist pattern. This periodic pattern may be permanently written to the storage medium during a manufacturing process. The periodic pattern is sensed from the storage medium (block 410) using processes known in the art. Where the storage medium is a disk in a hard disk drive, this process may include moving a read/write head assembly in relation to the storage medium, and sensing a series of magnetic information from the storage medium. The sensed periodic pattern is sampled using a sampling clock that is a combination of a sampling frequency corresponding to the frequency of the periodic pattern plus a slight offset frequency to yield a sample (x(n)) (block 415). In one particular embodiment of the present invention, the sight offset is approximately one percent (1%) of the frequency of the sampling clock. The sight offset may be provided as an external clock input, or may be generated by dividing a sampling clock providing the sampling frequency. Based on the disclosure provided herein, one of ordinary skill in the art will recognize a variety of sources for the slight offset frequency and/or circuits for deriving the slight offset frequency.

It is determined if a sufficient number of samples have been received (block 420). The number of samples corresponds to the size of the integration window. In some embodiments of the present invention, the size of the integration window is programmable to include between sixteen and sixty-four samples. Where the number of samples corresponding to the integration window has not yet been received (block 420), a sample counter (i) is incremented (block 425) and another sample is generated (block 415). This process of sampling (blocks 415 through 425) continues until enough samples are received (block 420). Once enough samples have been received (block 420), the magnitude of a partial discrete Fourier transform is calculated (block 430). In particular, the samples from the integration window are multiplied by a Nyquist sequence in accordance with the following equation:

$$S(n) = \sum_{i=0}^{i=k-1} Sample_i * (-1)^i,$$

where k corresponds to the number of samples in the integration window, and x corresponds to the particular instance of the partial discrete Fourier transform. Once integrated, a resulting magnitude or absolute value of the integration is calculated in accordance with the following equation:

$$|S(n)| = \text{absolute}\left[\sum_{i=0}^{i=k-1} Sample_i * (-1)^i\right].$$

Once calculated, the periodic pattern from the storage medium is sensed (block 435), the value of n is incremented in preparation for calculating the next instance of the partial discrete Fourier transform (block 440), and the sample counter (i) is reset to zero (block 445).

The newly calculated partial discrete Fourier transform magnitude (|S(n)|) is aggregated with accumulating partial discrete Fourier transform magnitudes in accordance with the following equation:

$$A = A + |S(n)|.$$

The accumulated value is stored (block 455). It is then determined whether enough partial discrete Fourier transforms have been calculated (i.e., the number of integration windows that have been processed) (block 460). In some embodiments of the present invention, the number of discrete Fourier transforms is programmable based upon the overall number of samples to be processed in accordance with the following equation:

Number of Discrete Fourier Transforms=Number of Samples/Number of Samples per Integration Window.

By using a large number of samples, it is possible to assure that all possible sampling phases of the periodic pattern are exercised. The required number of samples corresponds to the magnitude of the slight offset frequency used to modify the sampling process. By assuring that all of the sampling phases are included, a repeatable and predictable average result is possible without regard for when in the period the initial sample is received.

Where enough partial discrete Fourier transforms have not yet been calculated (block 460), the processes of blocks 415 through 455 are repeated until the desired number of discrete Fourier transforms are available. Alternatively, where enough partial discrete Fourier transforms have been calculated (block 460), the accumulated sum of discrete Fourier transforms (i.e., aggregate discrete Fourier transforms) is compared against a baseline discrete Fourier transform value (block 465). The baseline discrete Fourier transform value is a value that corresponds to a known, desired fly-height. In some cases, the baseline discrete Fourier transform value is calculated using the processes of blocks 405 through blocks 460 at an initialization or manufacturing point.

As the baseline discrete Fourier transform value corresponds to a known, desired fly-height, a non-equal comparison of the newly calculated accumulated sum of discrete Fourier transforms and the baseline discrete Fourier transform value indicates a change in fly-height. Thus, it is determined whether the newly calculated aggregate discrete Fourier transform has changed relative to the baseline discrete Fourier transform value (block 470). Where the newly calculated accumulated sum of discrete Fourier transforms and the baseline discrete Fourier transform value are equal (block 470), no change in fly-height is indicated (block 480). Alternatively, Where the newly calculated accumulated sum of discrete Fourier transforms and the baseline discrete Fourier transform value are not equal (block 470), a change in fly-height is indicated (block 475).

Once completed, the process of determining a fly-height change is repeated. As part of this, the counter of partial discrete Fourier transform values (x) is reset (block 485) and the aggregate discrete Fourier transform (A) is reset. Once reset, the processes of blocks 410 through 480 are repeated periodically to determine if a change in fly-height is developing over time.

In conclusion, the invention provides novel systems, devices, methods and arrangements for performing fly-height change detection based on a Nyquist pattern. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
   a storage medium, wherein the storage medium includes a periodic data pattern, and wherein the periodic data pattern repeats at a data frequency;
   an offset frequency;
   a read/write head assembly disposed in relation to the storage medium, wherein the read/write head assembly senses the periodic data pattern and provides a sensed periodic data pattern; and
   a harmonic fly-height change detection circuit, wherein the harmonic fly-height change detection circuit samples the sensed periodic data pattern at an aggregate frequency to yield a first set of samples and a second set of samples, wherein the aggregate frequency is the data frequency adjusted by the offset frequency, and wherein the harmonic fly-height change detection circuit calculates a first magnitude of the first set of samples and a second magnitude of the second set of samples; and wherein the harmonic fly-height change detection circuit is operable to detect a change in a distance between the storage medium and the read/write head assembly based at least in part on a combination of the first magnitude of the first set of samples and the second magnitude of the second set of samples.

2. The storage device of claim 1, where the aggregate frequency is the data frequency less the offset frequency, and wherein the offset frequency is operable to move at least one edge of the aggregate frequency away from alignment with the periodic data pattern.

3. The storage device of claim 1, where the aggregate frequency is the data frequency plus the offset frequency, and wherein the offset frequency is operable to move at least one edge of the aggregate frequency away from alignment with the periodic data pattern.

4. The storage device of claim 1, wherein the first set of samples are included in a first integration window, wherein the second set of samples is included in a second integration window; wherein the first magnitude of the first set of samples is a magnitude of a discrete Fourier transform of the first integration window, and wherein the second magnitude of the second set of samples is a magnitude of a discrete Fourier transform of the second integration window.

5. The storage device of claim 4, wherein the first magnitude of the first set of samples is calculated in accordance with the following equation:

$$\text{absolute value of } \left[\sum_{i=0}^{i=k-1} Sample_i * (-1)^i\right],$$

where k corresponds to the number of samples in the first integration window.

6. The storage device of claim 4, wherein the harmonic fly-height change detection circuit includes an accumulator circuit, and wherein the accumulator circuit is operable to sum at least the first magnitude of the first set of samples and the second magnitude of the second set of samples to yield and aggregate value.

7. The storage device of claim 6, wherein the aggregate of the first magnitude of the first set of samples and the second magnitude of the second set of samples is done in accordance with the following equation:

$$\text{absolute value of } \left[\sum_{i=0}^{i=k-1} Sample_i * (-1)^i\right] +$$
$$\text{absolute value of } \left[\sum_{i=k+n}^{i=2k+n-1} Sample_i * (-1)^i\right],$$

where k corresponds to the number of samples in the first integration window and the second integration window, and wherein n is the number of samples between the first integration window and the second integration window.

8. The storage device of claim 7, wherein n is equal to zero.

9. The storage device of claim 8, wherein k is a value between sixteen and sixty four.

10. The storage device of claim 9, wherein the value of k is programmable.

11. The storage device of claim 6, wherein the harmonic fly-height change detection circuit includes a comparator, and wherein the comparator compares the aggregate value with a baseline value.

12. The storage device of claim 11, wherein the comparator asserts a fly-height change indicator when the magnitude of the difference between the aggregate value and the baseline value exceeds a threshold value.

13. The storage device of claim 12, wherein the threshold value is zero.

14. The storage device of claim 1, wherein the periodic pattern is a Nyquist pattern, and wherein the data frequency is a Nyquist frequency.

15. A method for identifying distance error based on Nyquist data, the method comprising:
   providing a baseline value corresponding to a known position;
   providing a storage medium, wherein the storage medium includes a periodic data pattern, and wherein the periodic data pattern repeats at a data frequency, and wherein the known position is a distance between the storage medium and a sensing device;
   providing an offset frequency;
   sampling the periodic data to yield a plurality of sample sets corresponding to respective integration windows, wherein the sampling is done at an aggregate frequency, and wherein the aggregate frequency is the data frequency adjusted by the offset frequency;
   calculating a magnitude for each of the respective integration windows;
   aggregating the magnitudes corresponding to each of the respective integration windows to yield an aggregate value;
   comparing the aggregate value with the baseline value; and
   asserting a signal indicating a change in the known position when the magnitude of the difference between the aggregate value and the baseline value exceeds a threshold value when the magnitude of the difference between the aggregate value and the baseline value exceeds a threshold value.

16. The method of claim 15, wherein the magnitudes corresponding to each of the respective integration windows are calculated using a discrete Fourier transform of the samples included in the respective integration window.

17. The method of claim 16, wherein the magnitudes corresponding to each of the respective integration windows are calculated in accordance with the following equation:

$$\text{absolute value of } \left[\sum_{i=0}^{i=k-1} Sample_i * (-1)^i\right],$$

where k corresponds to the number of samples in the respective integration window.

18. The method of claim 15, wherein the threshold value is zero.

19. The method of claim 15, wherein the periodic pattern is a Nyquist pattern, and wherein the data frequency is a Nyquist frequency.

20. A Nyquist tone circuit, the circuit comprising:
   a baseline value;
   an offset frequency;
   a frequency summation circuit, wherein the frequency summation circuit yields an aggregate frequency that is a data frequency adjusted by the offset frequency, and wherein the data frequency corresponds to a periodicity of an input data stream;
   a sampling circuit, wherein the sampling circuit samples the input data stream at the aggregate frequency to yield a plurality of sample sets corresponding to respective integration windows;
   a magnitude calculation circuit, wherein the magnitude calculation circuit calculates a magnitude for each of the respective integration windows;
   an aggregation circuit, wherein the aggregation circuit sums the magnitudes corresponding to each of the respective integration windows to yield an aggregate value; and
   a comparator circuit, wherein the comparator circuit compares the aggregate value with the baseline value and asserts a fly-height indicator signal based at least in part on the comparison.

21. The method of claim 15, wherein the offset frequency is operable to move at least one edge of the aggregate frequency away from alignment with the periodic data pattern.

22. The circuit of claim 20, wherein the offset frequency is operable to move at least one edge of the aggregate frequency away from alignment with the input data stream.

* * * * *